United States Patent [19]
Beyers

[11] Patent Number: 5,483,746
[45] Date of Patent: Jan. 16, 1996

[54] HAND OPERATED CHANNEL NOTCHING TOOL AND METHOD OF NOTCHING

[76] Inventor: Gerald W. Beyers, 2865 Lilac La., Fargo, N. Dak. 58102

[21] Appl. No.: 979,004

[22] Filed: Nov. 19, 1992

[51] Int. Cl.⁶ .................................................. B26B 13/00
[52] U.S. Cl. ........................... 30/229; 30/251; 52/DIG. 1; 52/749.1
[58] Field of Search ........................... 30/229, 251, 254; 52/749, DIG. 1

[56] References Cited

U.S. PATENT DOCUMENTS

| | | | |
|---|---|---|---|
| 812,645 | 2/1906 | Gardner | 30/229 |
| 816,279 | 3/1906 | Trogden | 30/229 |
| 2,219,602 | 10/1940 | Rayner | 30/229 X |
| 2,473,073 | 6/1949 | Rembold | 30/229 |
| 2,595,841 | 5/1952 | Glick et al. | 30/229 |
| 3,091,853 | 6/1963 | Polayes | 30/229 |
| 3,279,295 | 10/1966 | Teplitz | 30/229 X |
| 3,372,482 | 3/1968 | Mercorelli | 30/229 |
| 3,393,595 | 7/1968 | Halverson et al. | 30/229 X |
| 4,106,195 | 8/1978 | Berg | 30/229 X |
| 4,543,719 | 10/1985 | Pardoe | 30/229 X |

FOREIGN PATENT DOCUMENTS

| | | | |
|---|---|---|---|
| 3100998 | 7/1982 | Germany | 30/251 |

Primary Examiner—Steven N. Meyers
Assistant Examiner—Suzanne L. Dino
Attorney, Agent, or Firm—Harris, Tucker & Hardin

[57] ABSTRACT

A hand operated slot-forming tool has an elongated nose portion having a mechanically advantaged dual edge cutting blade which is pivotally mounted over a slotted dual element anvil blade having shearing edges which work in opposition to the dual edges of the cutting blade in response to squeezing of handles on the tool which cause the cutting edges to close together in gradual shearing contact with stock to be slotted. The cutting blade can be placed in abutting contact with the right angled leg to produce a slot having one edge lying at the intersection of right angle legs of a channel member. Uniform reproducible slots are produced. The slot-forming tool is used to produce spaced apart slots in the ends of light gauge channel members to interconnect two slotted channel-shaped pieces to form an interconnected corner for the trim of a portion of the building wherein a uniform flap is used to create an opening in the end of one member with the similar flap in the other member being bent over the uncut remaining web portion to quickly produce a quality corner joint requiring very little caulking, the joint so formed being completely uniform and reproducible.

13 Claims, 2 Drawing Sheets

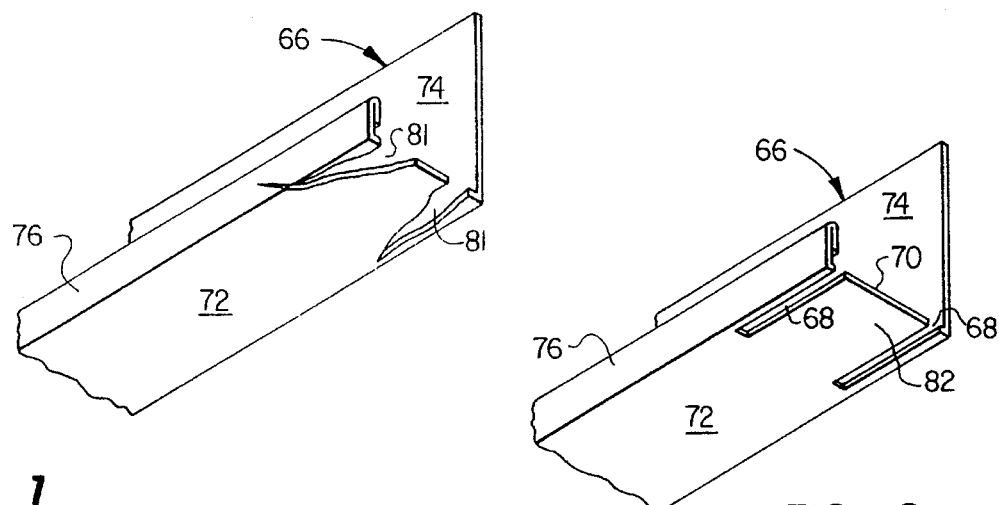
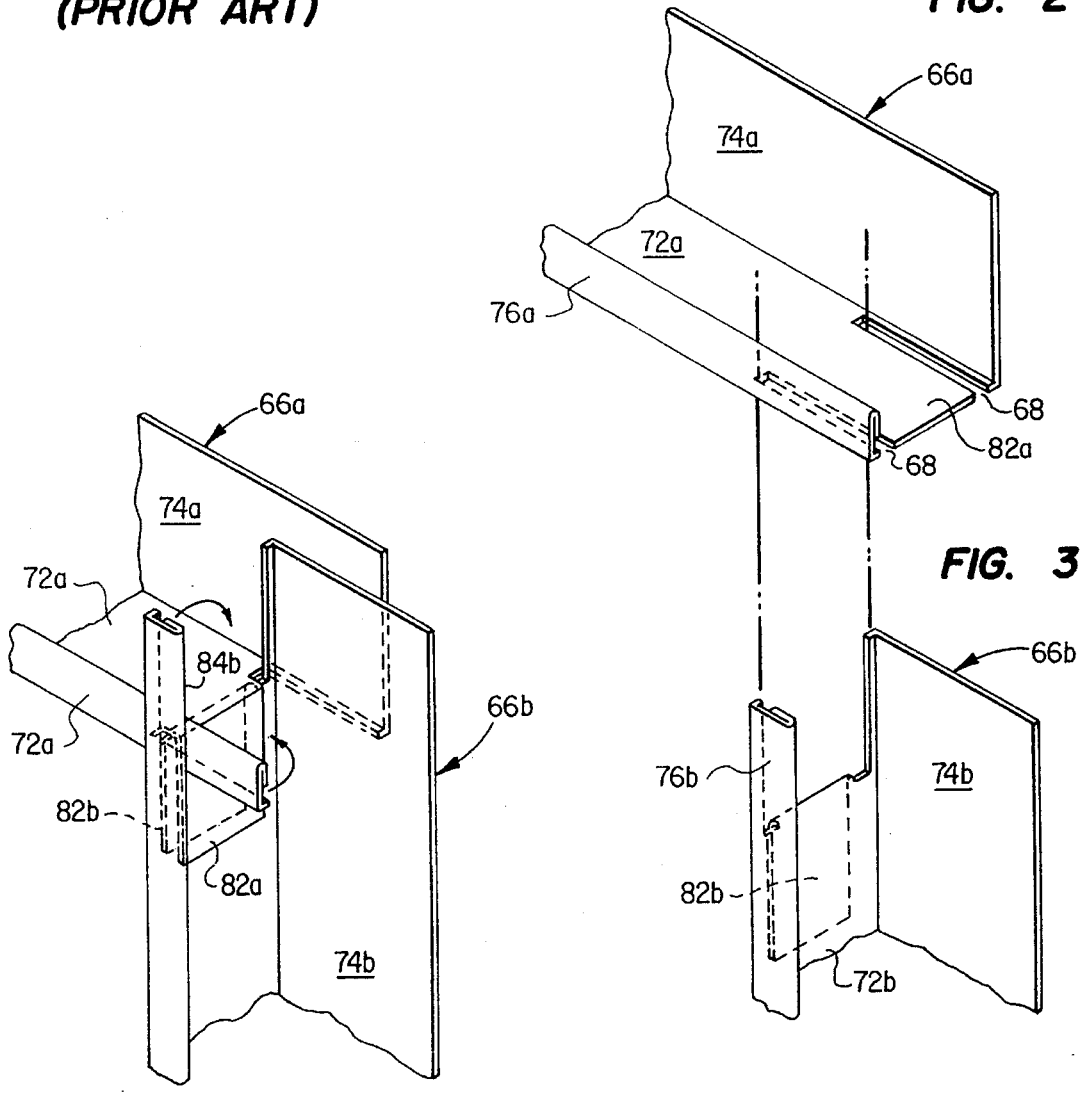
FIG. 1 (PRIOR ART)
FIG. 2
FIG. 3
FIG. 4

HAND OPERATED CHANNEL NOTCHING TOOL AND METHOD OF NOTCHING

BACKGROUND OF THE INVENTION

1. Field of the Invention

A hand operated notching tool and method produces smooth edged notches closely abutting an angled wall, which is especially useful in the siding industry.

2. Background of the Prior Art

In the sheet metal working industry, it is often desirable to produce notches in sheet metal for various purposes. For example, in the siding industry, channel shaped pieces are notched at their ends so that they may be joined with their ends together at corners where pieces meet at right angles. This allows a horizontal element and a vertical element to be joined by interengaging and interlocking them without necessarily using fasteners. Such pieces may be used around windows and doors of a building which is being covered in metal siding. Metals, such as aluminum or steel, are used in relatively thin gauges which can be cut with ordinary tin shears.

In the conventional situation, a channel shaped piece or a "J"-shaped channel is altered by making four cuts with a pair of tin shears in order to produce a flap at the end of the piece. The cuts are made in pairs to produce V-shaped cutouts next to the channel legs at the end of a channel shaped piece. The flap between the V-shaped cutouts can then be bent back upon the material or cut off to cream an opening in the end of one piece which, for sake of example, might be a vertical piece. A mating horizontal piece is similarly altered by making four cuts with tin shears to cut out triangular areas to create another flap which can be bent back also. This creates an opening at the end of the "web" of the channels whereby the walls of the channel legs can be interengaged. For example, the outside wall of a horizontal piece can be lying against the inside wall of a vertical piece and the inside of the other wall of the horizontal piece lying against the outside wall of the vertical piece.

The use of tin shears to make these V-shaped cutout notches in the central web at the ends of channel shaped pieces is time consuming and produces rough, irregular edges which often do not fit properly together. They often require additional curing and trying in order to make the ends fit. Depending upon the size of the channels, it is sometimes necessary to make more than four cutting operations in order to produce appropriately sized V-shaped notches. The shears' thick blades do not permit conveniently making the cuts closely abutting along the angled walls of the channel legs. These shears produce rough, irregular edges which are extremely sharp and dangerous to the workmen. Consequently, it would be desired to have a tool and method which will produce notches abutting the wall of the leg of an angled piece or channel, the cutout notches having smooth edges sheared in a uniform manner time after time.

SUMMARY OF THE INVENTION

The present invention is a specially designed notching tool and method of notching slots in stock having right angled wall sections and making interconnected corners for trimming a portion of a building by means of slotting and interconnecting two channel-shaped pieces of sheet metal stock, preferably steel or aluminum stock commonly used in the siding industry. The hand-operated notching tool may conveniently be carried to the job site and used to produce identical elongated slots at the ends of channels having fight angled walls in order to make joints and other modifications where removal of slot-shaped cutouts is desired.

The tool has opposed manually graspable handles which have free ends and are pivoted together at a common handle pivot and biased toward an open position. Each handle has extensions which extend forwardly from the handle beyond the common handle pivot. They move further apart as the handles are squeezed to move closer together. Pivotally connected near the end of the handle extensions of the lowermost of the opposed handles is a dual element anvil blade extending forwardly from the handles, having elongated cutting edges spaced apart at distance equal to the width of a cutting blade. Pivoted near the ends of the handle extensions of the uppermost of the opposed handles is an elongated cutting blade having dual cutting edges, extending forwardly from the handles. The cutting blade is mounted centrally for movement in a cutting plane to a cutting position between opposed plate-like members which comprise the dual element anvil blade. The cutting edges of the cutting blade are positioned above cutting edges on the dual element anvil blade and moved downwardly in shearing contact with the edges of the anvil blade. The cutting blade and dual element anvil blade are pivoted together forwardly of the pivotal connection with the handle extensions, to provide a mechanically advantaged shearing force to their cutting edges in response to force produced by squeezing the handles. A cutting area is defined by a nose portion of the cutting blade and anvil blades extending forwardly from the common pivot between them.

The curing edges of the cutting blade are shaped to simultaneously cut from the front and rear of a slotted cutout section towards the middle of the slot in order to provide a slot having clean, sheared edges along the cutout section of stock. At least a portion of the cutting blade is guided and supported by at least a portion of the dual element anvil blade and separates them a cutting width apart. The width of the cutting blade which is guided and supported by the dual element anvil blade defines the spacing of the cutting edges of the anvil blade. The cutting edges of the anvil blade comprise a duality of parallel extending edges forwardly the pivot with the cutting blade which lie in a planar orientation perpendicular to the movement of the cutting blade and they extend beyond the outer end of the cutting blade. The outer end of the anvil extending beyond the cutting blade is secured below the cutting edges by a fastening element which fixes the cutting width and is out of the way so that it does not interfere with the placement of the stock in position for being notched. A stop surface is provided forwardly of the pivot connecting the cutting blade and the anvil blades which establishes a uniform and repeatable length in the cutout section by contact with the end of the stock when the stock is inserted into the tool for cutting.

Since the nose portion of the cutting blade and the dual element anvil blades forwardly of the stop comprise a gap when the blades are in the open position, stock may be inserted with its end in contact with the stop but with the side wall of the cutting blade flush against the right angled wall which extends from the horizontal web of angled stock which is to be slotted. The undersurface of the end of the stock is thoroughly and fully supported by contact with the upper surfaces of the dual element anvil blades which makes it possible to cut a slot immediately abutting the plane of the inside wall of a right angled leg of a channel, for instance. In this manner a uniform repeatable and reproducible slot is quickly and easily cut in one simple motion without the need for measuring or marking.

The end of angled stock material is inserted into the nose portion of the slot forming tool between the cutting blade and the anvil blade. The stock is positioned so that one angled wall of the stock is over the dual element anvil blade and the cutting blade abuts the adjacent angled wall of the stock. The slot-forming tool is operated by squeezing the handles while the stock is so positioned in order to move the cutting edges of the blade through the shearing edges of the anvil blades in order to form a slot having a longitudinal edge lying along and adjacent to the angled wall. The stock is inserted against the stop in the nose portion of the tool during the slot-forming operation in order to produce a slot of uniform repeatable length.

A corner may be produced to interconnect two channel-shaped pieces of metal stock by using the slot-forming tool to produce a slot in the web along the inside of the upright walls. This produces a flap which has a rectangular shape having a depth which is equal to the depth of the slots on either side. On a vertical one of the channels, this flap is folded over and bent back against the web to form an opening in the end to receive the end of the other channel piece. The other channel piece is arranged horizontally at right angle orientation into the opening at the end of the one piece with the legs of the pieces being arranged in overlapping orientation and the flap formed between the slots in the horizontal piece is bent over against the web of the vertical piece to cream a relatively waterproof connection between the flap and the central web of the vertical piece in order to allow rain water to run off. This also provides a mechanical interconnection of the ends of the pieces at the corner which can be further secured by fastening and caulked to create a watertight joint between the right angle oriented ends of the channel-shaped pieces by filing up any openings which remain where the slotted portions come together. This interconnecting method reduces the skill required to make a joint and makes it possible to produce corner joints between channel sections in much less time, produces a neater, more finished looking joint which has the advantage of requiring only a limited amount of caulking which further reduces the time element in construction. It also enhances the security of the joint because only small openings remain that need to be caulked and these are always essentially identically placed and identically sized, thanks to the uniform notches produced by the notching tool.

BRIEF DESCRIPTION OF THE FIGURES

FIG. 1 illustrates a prior art method of notching the end of a "J" channel which is used around "brick mold" in siding installations;

FIG. 2 is the same "J" channel having uniform notches adjacent the upstanding walls of the channel made with the notching tool and forming a flap in the web of the channel between the notches;

FIG. 3 shows how the flap is turned over against the web on a vertical channel to create an opening for the end of a horizontal channel which has been notched to create a flap;

FIG. 4 shows the interconnection between the notched horizontal and vertical channels of FIGS. 2 and 3 whereby the flap on the horizontal channel is bent over against the web of the vertical channel to create a corner joint which is further strengthened by bending over one or both of the extending portions of a short channel to create a lock or a double lock;

DETAILED DESCRIPTION OF THE INVENTION

Figures 5, 6A, 6B:
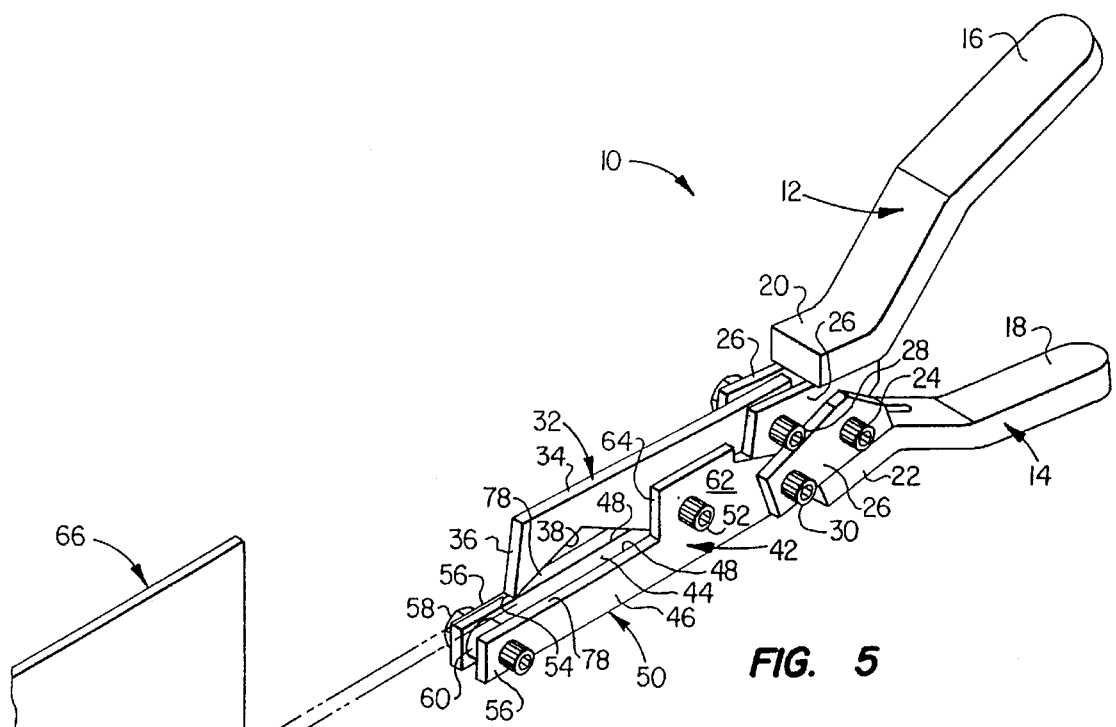
FIG. 5 is a perspective view of the notching tool of the invention and the end of a channel piece which is to be notched.
FIG. 6A is a side elevation of the notching tool or FIG. 5 with the main web of the channel in position for creating a notch by means of the notching tool.
FIG. 6B is a side elevation of the notching tool of FIG. 6A in the final stages of cutting the notch from the main web of a "J" channel.

In the description that follows, like elements will be described using the same reference numerals insofar as possible. One of the main uses of the invention is to prepare the ends of channel shaped members for interconnection at corners according to the apparatus and method of the invention. Examples are shown in FIGS. 14 in reference to a "J"-shaped channel member which was modified according to the prior art in FIG. 1. Modification according to the invention is shown in FIG. 2. Use of the modified structure is shown in FIGS. 3 and 4.

In FIG. 5 a hand-operated notching tool is generally designated by the reference numeral 10. The notching tool has a pair of opposed handle 12,14 having movable free ends 16, 18 which are manually graspable for squeezing the free ends closer together. The handles each have an end 20,22 opposite the free ends. The handles are pivoted together at a common handle pivot 24 and biased apart by biasing member 80 which may be a spring.

Each handle has a pair of spaced apart handle extensions 26 which extend with respect to the handles beyond pivot 24 in a forward direction. They are angled away from each other in a direction which is opposite to the angle of the handles 12,14. One of the handle extensions 26 on handle 14 is hidden from view in FIG. 5, but it is an exact mirror image of handle extension 26 which can be seen. The handle extensions move further apart as the handles 12, 14 move closer together. The handle extensions are fixed to end portions 20,22 of the handles proper. Each pair of spaced apart handle extensions 26 have a pivotal connection 28,30 forwardly of the common handle pivot 24. Extending through paired handle extensions 26 of handle 12 is pivot 28. Similarly, extending through paired handle extensions 26 of handle 14 is pivot 30.

Elongated cutting blade 32 is pivotally connected at its handle end by means of pivotal connection 28 to handle extensions 26 of handle 12. Cutting blade 32 has a nose portion 34 at the forward end opposite the handles, which terminates in a tip portion 36. Cuffing blade 32 has a finite width which is preferably uniform throughout its length. Its cutting edges define the ultimate width of the elongated notch which will be cut out of stock. Cuffing blade 32 has dual cutting edges 38 on the lower surface on either side of the width of blade 32. Cutting edges 38 are spaced apart by the width of the blade and may have different shapes to accomplish a progressive shearing action in combination with opposing cutting edges. The cutting edges of blade 32 are spread over a cutting area 40 along nose portion 34 as better seen in FIG. 6A.

Cuffing blade 32 is mounted centrally with respect to the handles with its handle end pivotally connected between a pair of handle extensions 26 for movement to a cutting position. In the cutting position its cutting edges 38 pass against and between the cutting edge portions 48 of a dual element anvil blade 42. Dual element blade 42 comprises a pair of spaced apart elongated plates 44,46 each having a handle end pivotally connected to the handle extensions at pivotal connection 30. The handle end of one of the dual elements 44 is pivotally connected to a handle extension 26 of handle 14 by means of pivot 30, although it is hidden in FIG. 5. It is a mirror image of plate element 46 which is better seen in FIG. 5. Anvil plate 46 is pivotally connected at its handle end to a handle extension 26 of handle 14 by the same pivot 30. Each of plate portions 44,46 have an interiorly located cutting edge 48 and a nose portion 50 corresponding to nose portion 34 of the cutting blade. These cutting edges are located on the upper surface so that during movement of the cutting blade 32 downwardly toward the dual element anvil blade, the edges 38 of cutting blade 32 will cooperate with edges 48 to create a progressive shearing action along both sides of an elongate notch all along cutting area 40.

A common pivot 52 pivotally connects a medial portion of cutting blade 32 with the dual element anvil blade 42 forwardly of the pivots connecting the handle ends of those elements with the handle extensions. These pivots are arranged to provide a mechanically advantaged shearing force to cutting edges 38,48 in response to force produced by squeezing the handles 12,14. That portion of cutting blade 32 extending forwardly of common pivot 52 comprising nose portion 34 and cutting edges 38 is movable in a cutting plane in shearing contact with cutting edges 48 of dual element anvil blade 42. The cutting plane is preferably the same plane in which the handles move.

Nose portion 34 of cutting blade 32 terminates in a sharpened edge 54 which forms one end of a cutout section, elongated notch or slot upon initial contact with stock placed between the blades. The dual element anvil blades have outer end portions 56 which extend forwardly beyond the end or tip portion 36 of cutting blade 32. These are secured below the cutting edges 48 by means of fastening element 58 in cooperation with spacer 60 to fix the curing width at the outer end.

A medial portion of cutting blade 32 within the distance between its pivotal connection with the anvil blades and the handle extensions is guided and supported by an upstanding portion 62 on each of the dual elements 44,46 of anvil blade 42, in the vicinity of pivot 52. In this manner, blade 32 separates the dual anvil elements and defines the spacing of the cutting edges of the dual element anvil blade. Cuffing edges 48 of the anvil blade may be described as comprising a duality of parallel extending edges forward of the pivot with cutting blade 32 which lie in a planar orientation perpendicular to the plane of movement of cutting blade 32 and extend beyond the outer end of the cutting blade. Stop surface 64 is provided on each of the dual elements 44,46 just ahead of pivot 52.

Stop surface 64 establishes a uniform and repeatable length in the cutout section or slot by contact with the end 70 of the stock when stock is inserted into the tool for cutting. This is indicated by the length of the elongated notch 68 which will be formed in stock 66 in response to operation of the device. As indicated in FIG. 5, insertion of stock 66 into the nose of the hand-operated notching tool results in end edge 70 coming into contact with stop surface 64 to establish a maximum length of elongated notch or slot 68. It is possible to produce a shorter notch if the stock 66 is inserted to a distance less than the full distance established by surfaces 64.

The operation of the hand operated notching tool is illustrated best in FIGS. 5–6B. FIG. 5 illustrates what is referred to as a "J"-channel 66 which is commonly used in the siding industry to form trim around windows, etc. Channel 66 has a web portion 72, a leg 74 and a shorter leg 76. The cross-section forms the letter "J" . For purposes to be described, it is desirable to form cutout areas or elongated slots in the web 72 immediately adjacent to the fight angled legs 74 and 76.

In FIG. 6A, the end of channel piece 66 has been inserted into the cutting area 40 with the end 70 of web 72 against stop surface 64. The bottom surface of web 72 lies supported by flat parallel surfaces 78 running horizontally along the upper portion of the dual element anvil in nose portion 50. Flat surfaces 78 extend from stop surface 64 all the way to the end to provide rigid support for the stock material during the cutting operation.

It will be seen in FIG. 6A that handles 12,14 are being squeezed together in the direction of the arrows, and nose portion 34 of the cutting blade is moving in the direction of the arrow toward the stock. It will be noted that dual cutting edges 38 are more specifically described as cutting edges 38a which run to the sharpened edge 54 and the cutting edge 38b which run to the surfaces 64, it being understood that dual cutting edges 38 are comprised of cutting edges 38a and 38b. There is one set on either side of the blade. This may be described as a duality of parallel oriented cutting edges in the form of a triangular shape with its apex located above the middle of cutting area 40. These cutting edges depend downwardly in a forward and rearward direction so that cutting can begin first at the ends of the cutout area and end lastly at the middle of the cutout area.

FIG. 6B shows the orientation after the handles have been fully squeezed and cutting edges 38a and 38b located on either side of cutting blade 32 have moved through and past against curing edges 48 to completely remove the slotted area 68 from web 72. The cutting edges 38a,38b are so shaped to simultaneously cut from the front and rear of the cutout section towards the middle to produce clean, sheared edges along cutout section 68 of stock 66.

There is a small gap over the anvil blades in FIG. 6A between the sharpened edge 54 on tip 36 and the rearmost portion of edge 38b along the side of the cutting blade next to the stop. Thus it is that when the handles are further pressed sharpened edge 54 contacts the stock at about the same time as the edges 38b contact end 70. Since the stock is so well supported by the dual element anvil blades, the blades 38 on both sides of the cutting blade and the blades 48 on the inside of the anvil plates 44,46 create only shearing forces while the uncut center portion of the material being cut below apex A of the triangle formed by the cutting edges 38a,38b, remains securely connected to the web as cutting progresses. The small amount of material engaging the cutting edges at any given time minimizes the mount of force required on handles 12,14 in order to easily accomplish snipping a slot out of ordinary siding stock. Although dual edges 38 are indicated as being intersecting straight lines tapering from the middle downwardly from the front and rear, they could be arcuate shaped or some other shape. What is necessary is that the material be placed in shear by close contact between edges 38,48 and that only a small portion of the material is under shear at a given time. The mechanical advantage is preferably provided by the placement of the movable pivoting connections 28,30 with respect to the fixed pivoting connections 52 and 24. For example, the distance between handle pivot 24 and movable pivot 28,30 was about $23/32$ inches while the distance from fixed common pivot 52 to movable pivots 28,30 was about $36/32$ inches to give a mechanical advantage ratio of about 1.5. Other ratios could be used to give more or less mechanical advantage depending on the thickness and strength of stocks to be slotted. It should be emphasized that tool 10 makes it possible to make a slot having one longitudinal edge lying in the plane of the inside surface wall of an angled leg even closer to the wall than the slots 68 illustrated in the drawings. This is because the cutting blade above the dual element and blades is unobstructed and can be placed with its side flush against the wall.

The way the hand operated notching tool is utilized to provide a quicker, neater and more easily waterproof joint for brick molding around doors and windows is illustrated in FIGS. 1–4. Although the illustration uses what is referred to as a "J"-channel stock 66, the advantage of the notching tool 10 can be easily visualized with respect to channels or other sections which require notches lying closely along right angled legs. In FIG. 1 the prior art installer is reduced to making crude generally V-shaped cutouts 81 in web 72 with hand shears. In contrast, FIG. 2 shows the end of the J-channel stock in which neat slots of a specific dimension are created by using the tool in the manner described with respect to FIGS. 5–6B. One slot 68 has a longitudinal edge lying along the angled wall or leg 74 which is at right angles to web 72. Another slot 68 is cut with a longitudinal edge abutting the inside wall of the shorter leg 76 leaving a flap 82 of generally rectangular shape. Slots 68 are exactly the same width and depth because they were produced using notching tool 10.

In FIG. 3, a first piece 66a and a second piece 66b of channel-shaped stock having a central web portion and on either side of the web portion upstanding legs which extend linearly along the length of the pieces. A pair of spaced apart elongated slots are prepared in the end of the central web of the first and second pieces along the inside surface wall of each leg by inserting the nose portion of the slot forming tool illustrated in FIG. 5 against the ends of the first and second pieces with the cutting blade against the inside walls of the legs to form slots having one edge lying along the inside wall of each leg in the manner shown in FIGS. 5–6B as illustrated in FIG. 2. Flap 82 of piece 66b has been bent back against the underside of web 72 to open the central web portion of second piece 66b for insertion of the end of first piece 66a in order to form a corner joint.

The completed joint is illustrated in FIG. 4 where first piece 66a is arranged horizontally and second piece 66b is arranged vertically. The first and second pieces are arranged at right angle orientation. The central web flap 82a of the first piece is inserted into the opening of the central web at the end of the second piece. Flap 82a defined by the spaced apart slots 68 is bent at a right angle against the inside surface of central web 72b of second piece 66b. The legs of the first and second pieces are arranged in overlapping orientation. The outer surface of wall or leg 74 abuts the inner wall surface of upright leg 74a and the inner surface of upright leg 76b abuts the outer surface of upright leg 76a of first piece 66a. Now the terminal end 84b of leg 76b is bent over and around the leg 76a to form a lock. The extreme outer end 86a of leg 76a may be cut off or folded back in the direction of the arrow around the bent over portion 84b to form a further lock between the pieces. It should be recognized that overlapping could also be done on the opposite wall surfaces so that the inside surface of the large leg of channel 66b could be overlapped by the outside surface of the large leg of channel 66a with the inside of the small leg 76a against the outside of the small leg 76b.

To complete the corner, the upright legs 74a,74b may be nailed to the building to hold them in place. Thanks to the fact that slots 68 are only about ⅛" wide and 1 ¼ long and are cut immediately adjacent and abutting the right angle walls of the legs, only a small opening remains to be caulked in order to have a completely water resistant trim. Water collecting in horizontal trim 66a runs out the opposite ends and over the flaps 82a and drain harmlessly away. Since slots 68 are always exactly the same size, the corner joint is much more uniform, neat, free of sharp edges and repeatedly reproducible. In contrast, the prior art method produces rough, irregular joints with sharp, dangerous edges. The necessity of making large, irregular triangular shaped cutout sections with tin snips leaves gaping holes between the joints at the corner which are difficult to completely fill with caulk. After the joints illustrated in FIG. 4 are completed, siding is installed into or up against the approximately ¾ to 1" opening in the "J"-channel sections 66a,66b to complete the job.

I claim:

1. A hand operated notching tool, comprising
   opposed handles having a movable free end manually graspable for squeezing the free ends closer together, said handles having an end opposite the free end, pivoted together at a common handle pivot, each handle having an extension beyond said pivot which move further apart as said handles move closer together;
   a biasing member connected to the handles tending to spread the free ends apart;
   a dual element anvil blade extending forwardly from the handles, having one end pivotally connected to one of said handle extensions, having elongated cutting edges spaced apart a distance equal to the width of a cutting blade;
   an elongated cutting blade having dual cutting edges, extending forwardly from the handles, having one end pivotally connected to the other of said handle extensions, mounted centrally for movement to a cutting position with the cutting edges positioned between the cutting edge portions of the dual element anvil blade; wherein the cutting edges of the cutting blade are shaped to simultaneously cut from the front and rear of the cutout section and towards the middle in order to produce a slot having clean, sheared edges along the cutout section of stock that is cut:
   the cutting blade and dual element anvil blade extending forwardly of a common pivot connecting them which is positions forwardly of the pivotal connections with the handle extensions, to provide a mechanical advantage shearing force to their cutting edges in response to force produced by squeezing the handles; and
   a portion of the cutting blade extending forwardly of the common pivot comprises an elongated cutting area defined by said dual cutting edges being movable in a cutting plane in shearing contact with the cutting edges of said dual element anvil blade in order to cut out a defined cutout section from stock material which is inserted between the blades.

2. The notching tool of claim 1 wherein the cutting edges of the anvil comprise a duality of parallel extending edges forward of the pivot with the cutting blade which lie in a planar orientation which is perpendicular to the plane of movement of the cutting blade and extend beyond the outer end of the cutting blade.

3. The notching tool of claim 2 further including a stop surface which establishes a uniform and repeatable length in the cutout section by contact with the end of the stock when stock is inserted into the tool for cutting.

4. The notching tool of claim 3 wherein the cutting edges of the cutting blade comprise a duality of parallel oriented cutting edges in the form of a triangular shape with its apex located above the middle of the cutting area and depending downwardly in a forward and rearward direction so that the cutting can begin first at the ends of the cutout area and lastly at the middle of the cutout area.

5. The notching tool of claim 4 wherein the outer end of the anvil blades which extend beyond the cutting blade is secured below the cutting edges by a fastening element which fixes the cutting width.

6. A hand operated notching tool, comprising opposed handles having a movable free end manually graspable for squeezing the free ends closer together, said handles having an end opposite the free end pivoted together at a common handle pivot, each handle having an extension beyond said pivot which move further apart as said handles move closer together:

a biasing member connected to the handles tending to spread the free ends apart:

a dual element anvil blade extending forwardly from the handles, having one end pivotally connected to one of said handle extensions, having elongated cutting edges spaced apart a distance equal to the width of a cutting blade;

an elongated cutting blade having dual cutting edges, extending forwardly from the handles, having one end pivotally connected to the other of said handle extensions mounted centrally for movement to a cutting position with the cutting edges positioned between the cutting edge portions of the dual element anvil blade:

the cutting blade and dual element anvil blade extending forwardly of a common pivot connecting them which is positioned forwardly of the pivotal connections with the handle extensions, to provide a mechanical advantaged shearing force to their cutting edges in response to force produced by squeezing the handles;

a portion of the cutting blade extending forwardly of the common pivot comprises an elongated cutting area defined by said dual cutting edges being movable in a cutting plane in shearing contact with the cutting edges of said dual element anvil blade in order to cut out a defined cutout section from stock material which is inserted between the blades: and a portion of the cutting blade within the distance between its pivotal connection with the anvil blade and said other handle extension which is guided and supported by a portion of the dual element anvil blade.

7. The notching tool of claim 6 wherein the portion of the cutting blade that is guided and supported by the portion of the dual element anvil blade within the distance described in claim 3 separates the dual anvil elements and defines the spacing of the cutting edges of the anvil blade.

8. The notching tool of claim 7 wherein the cutting edges of the anvil comprise a duality of parallel extending edges forward of the pivot with the cutting blade which lie in a planar orientation which is perpendicular to the plane of movement of the cutting blade and extend beyond the outer end of the cutting blade.

9. The notching tool of claim 8 wherein the outer end of the anvil blades which extend beyond the cutting blade is secured below the cutting edges by a fastening element which fixes the cutting width.

10. The notching tool of claim 9 wherein the outer end of the elongated cutting blade has a sharpened edge which forms one end of the cutout section upon initial contact with the stock.

11. The notching tool of claim 10 wherein the cutting edges of the cutting blade are shaped to cut simultaneously from front and rear of the cutout section towards the middle of the cutout section to produce clean, sheared edges along the cutout section.

12. The notching tool of claim 11 wherein the cutting edges of the cutting blade comprise a duality of parallel oriented cutting edges in the form of a triangular shape with its apex located above the middle of the cutting area and depending downwardly in a forward and rearward direction so that the cutting can begin first at the ends of the cutout area and lastly at the middle of the cutout area.

13. The notching tool of claim 12 further including a stop surface which establishes a uniform and repeatable length in the cutout section by contact with the end of the stock when stock is inserted into the tool for cutting.

* * * * *

UNITED STATES PATENT AND TRADEMARK OFFICE
CERTIFICATE OF CORRECTION

PATENT NO. : 5,483,746
DATED : January 16, 1996
INVENTOR(S) : Gerald W. Beyers

It is certified that error appears in the above-indentified patent and that said Letters Patent is hereby corrected as shown below:

```
Col. 8, line 45, delete "positions" and insert --positioned--.
Col. 9, line 29, insert --,-- after "sions".
Col. 10, line 10, in claim 7, delete "3" and insert --6--.
```

Signed and Sealed this

Sixteenth Day of April, 1996

BRUCE LEHMAN

*Attest:*

*Attesting Officer*   Commissioner of Patents and Trademarks